United States Patent
Lee et al.

(10) Patent No.: US 7,385,664 B2
(45) Date of Patent: Jun. 10, 2008

(54) LIQUID CRYSTAL DISPLAY MODULE

(75) Inventors: Joo-Hong Lee, Gyeongsangbuk-do (KR); Jae-Hyun Park, Busan (KR)

(73) Assignee: LG.Philips LCD Co., Ltd., Seoul (KR)

( * ) Notice: Subject to any disclaimer, the term of this patent is extended or adjusted under 35 U.S.C. 154(b) by 391 days.

(21) Appl. No.: 10/970,662

(22) Filed: Oct. 22, 2004

(65) Prior Publication Data

US 2005/0104828 A1   May 19, 2005

(30) Foreign Application Priority Data

Oct. 23, 2003   (KR) .................. 10-2003-0074374

(51) Int. Cl.
*G02F 1/1345* (2006.01)
(52) U.S. Cl. .................. 349/149; 349/150; 349/152
(58) Field of Classification Search ................ 349/149, 349/152, 58
See application file for complete search history.

(56) References Cited

U.S. PATENT DOCUMENTS

| | | | | |
|---|---|---|---|---|
| 5,436,745 A | * | 7/1995 | Voisin et al. | 349/58 |
| 6,525,789 B1 | * | 2/2003 | Lee | 349/58 |
| 2002/0126248 A1 | * | 9/2002 | Yoshida | 349/149 |

* cited by examiner

*Primary Examiner*—James A Dudek
(74) *Attorney, Agent, or Firm*—Morgan, Lewis & Bockius LLP

(57) ABSTRACT

A liquid crystal display (LCD) module includes a liquid crystal panel, a backlight assembly to supply light to the liquid crystal panel, at least one first flexible film having first printed circuit patterns, a gate driving integrated circuit (IC) on the first flexible film, at least one ground pad on the first flexible film, and a top case electrically connected to the ground pad.

19 Claims, 6 Drawing Sheets

LIQUID CRYSTAL DISPLAY MODULE

The present invention claims the benefit of Korean Patent Application No. 2003-0074374 filed on Oct. 23, 2003, which is hereby incorporated by reference.

BACKGROUND OF THE INVENTION

1. Field of the Invention

The present invention relates to a liquid crystal display (LCD) module, more particularly, to a chip on film (COF) type LCD module.

2. Description of the Related Art

Figure 1:
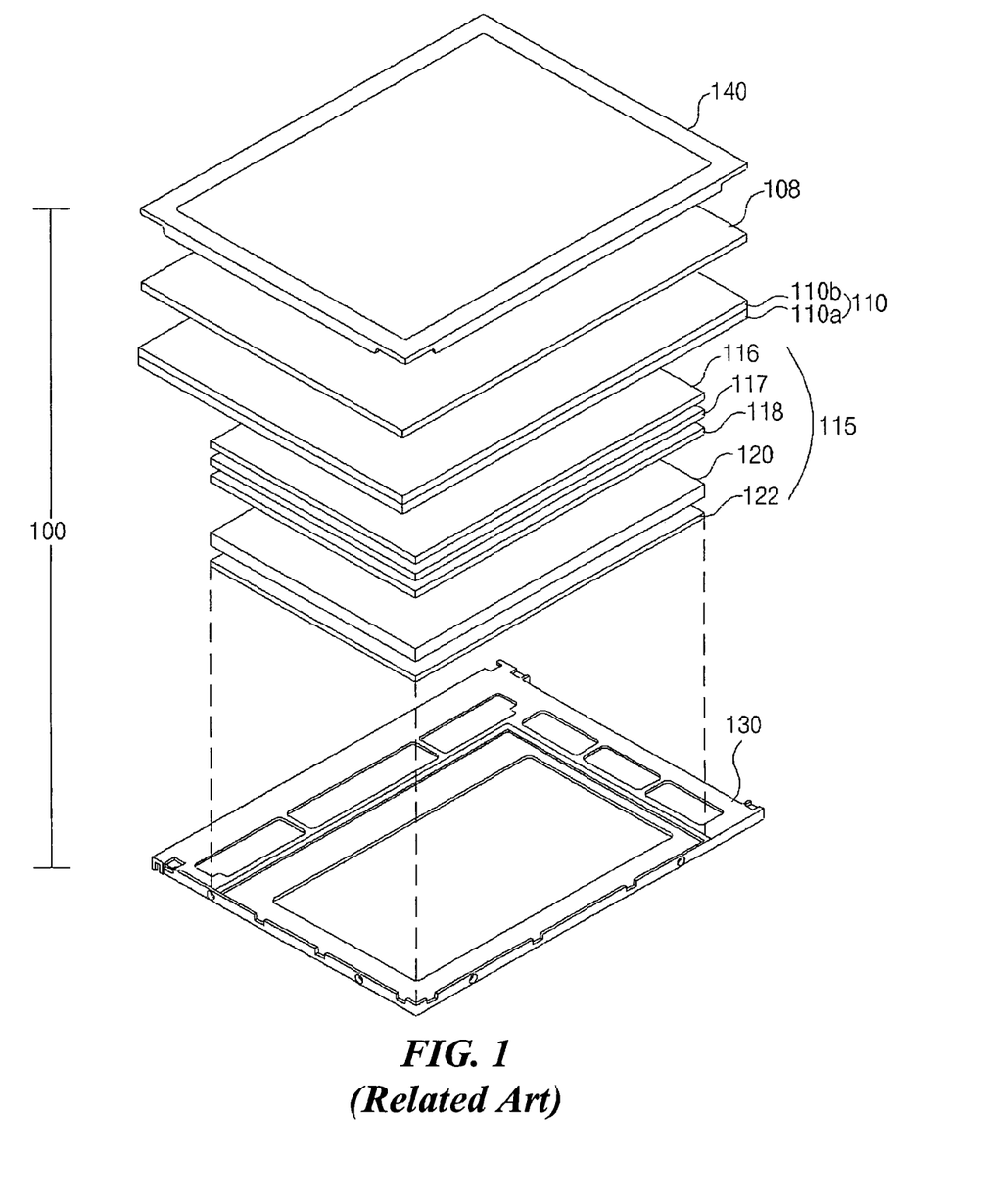
FIG. 1 is an exploded perspective view of a mounting structure of a liquid crystal display (LCD) module according to related art.

There are many types of flat panel display devices, including plasma display panels (PDPs), field emission displays (FEDs), and the widely used LCDs. FIG. 1 is an exploded perspective view of a mounting structure of an LCD module 100 according to related art. The LCD module 100 has a liquid crystal panel 110 and a polarizing sheet 108 disposed on the liquid crystal panel 110. The liquid crystal panel 110 consists of a lower substrate 110a, an upper substrate 110, and a liquid crystal layer (not shown) in between. The LCD module 100 further includes a backlight assembly. The backlight assembly comprises multiple prism sheets 116, 117, a diffusion sheet 118, a light guide plate 120, and a reflective plate 122. Additionally, the LCD module 100 includes a main support 130 where the liquid crystal panel 110 and the backlight assembly are installed. The liquid crystal module 100 also includes a top case 140 that fastens the liquid crystal panel 110 to the main support 130 and protects the liquid crystal panel 110 from external impact.

Although not shown in FIG. 1, a lamp housing including at least one lamp is generally installed in the main support 130. The at least one lamp is connected to an inverter (not shown) and emits light toward the liquid crystal panel 110. The light guide plate 120 is disposed under the diffusion sheet 118. The reflective plate 122 is disposed between the light guide plate 120 and the main support 130. The light guide plate 120 receives light emitted by the lamp and directs the received light to its output surface so that the light emitted by the lamp can reach the liquid crystal panel 110 via the diffusion sheet 118 and the prism sheets 117, 116. The reflective plate 122 reflects light emitted by the lamp toward the liquid crystal panel 110 to prevent loss of light and improve efficiency. The light emitted by the lamp and propagated through the backlight assembly generates images on the display panel while the liquid crystal panel 110 is operated and driven.

Although not shown in FIG. 1, the LCD module 100 includes a bottom cover adjacent to the main support 130 to protect the elements for the LCD module 100. The main support 130 supports the backlight assembly and the liquid crystal panel 110. The top case 140 fastens the liquid crystal panel 110 and the backlight assembly into the main support 130 by coupling them with the main support 130. The main support 130 and the top case 140 protect the liquid crystal panel 110 from external impact. The main support 130 is generally made of a plastic material having a sufficient impact resistant.

In the related art LCD device shown in FIG. 1, the top case 140 has a rectangular shape and an internal rectangular opening. The rectangular opening exposes a display area of the underlying liquid crystal panel 110 such that images are displayed on the exposed display. The liquid crystal panel 110 is driven by input signals transmitted from gate and data driving integrated circuits (ICs). Furthermore, a gate printing circuit board (PCB) and a data PCB control the gate and data driving ICs, respectively.

Figure 2:
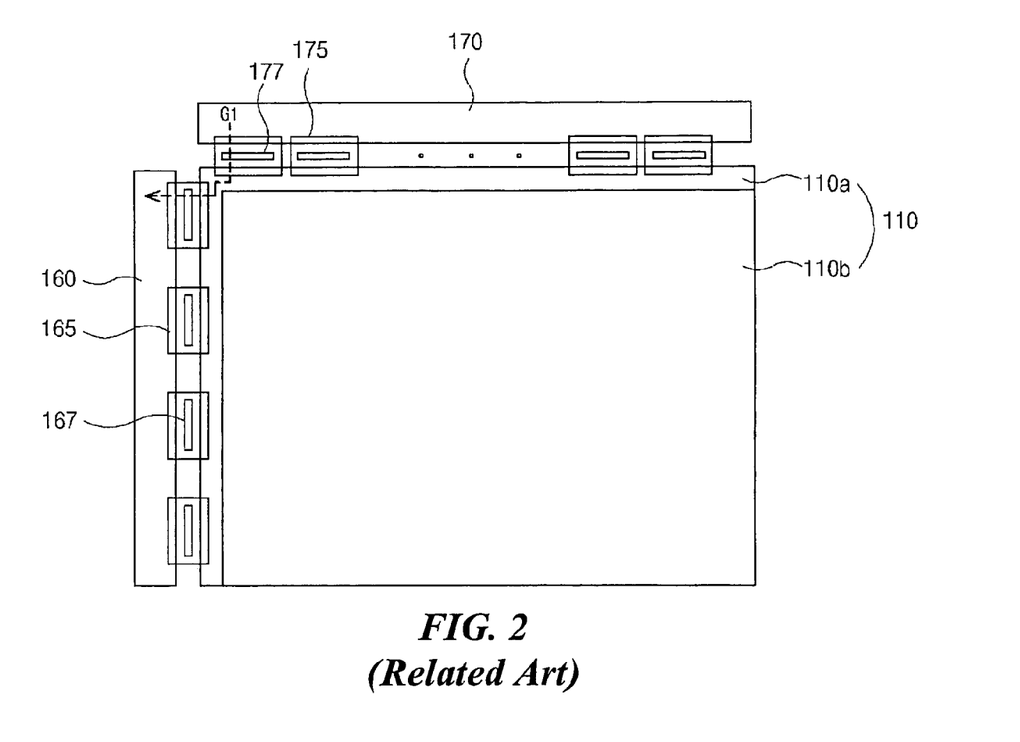
FIG. 2 is a schematic top plan view of a related art LCD module, and conceptually illustrates driving integrated circuits (ICs), printing circuit boards (PCBs) and their connection to a liquid crystal panel.

FIG. 2 is a schematic top plan view of a related art LCD module, and conceptually illustrates driving ICs, PCBs and their connection to a liquid crystal panel. As shown in FIG. 2, a gate driving IC 167 and a data driving ICs 177 are formed on a first flexible film 165 and a second flexible film 175, respectively, and connected to the liquid crystal panel 110 via the first and second flexible films 165 and 175. Additionally, the gate and data driving ICs 167 and 177 are communicating with gate and data PCBs 160 and 170, respectively, via the first and second flexible films 165 and 175. Although not shown in FIG. 2, the first and second flexible films 165 and 175 include printed circuits that transmit signals from the gate and data PCBs 160 and 170 to the gate and data driving ICs 167 and 177. Also, the first and second flexible films 165 and 175 transmit signals from the gate and data driving ICs 167 and 177 to the liquid crystal panel 110.

The LCD module of FIG. 2 includes a grounding path G1 to protect the above mentioned circuitries from static electricity to thereby prevent electrostatic damage. As shown in FIG. 2, the grounding path G1 interconnects the data PCB 170, data driving IC 177, gate driving IC 167 and gate PCB 160, and ground. This grounding method will be explained in more detail with reference to FIG. 3.

Figure 3:
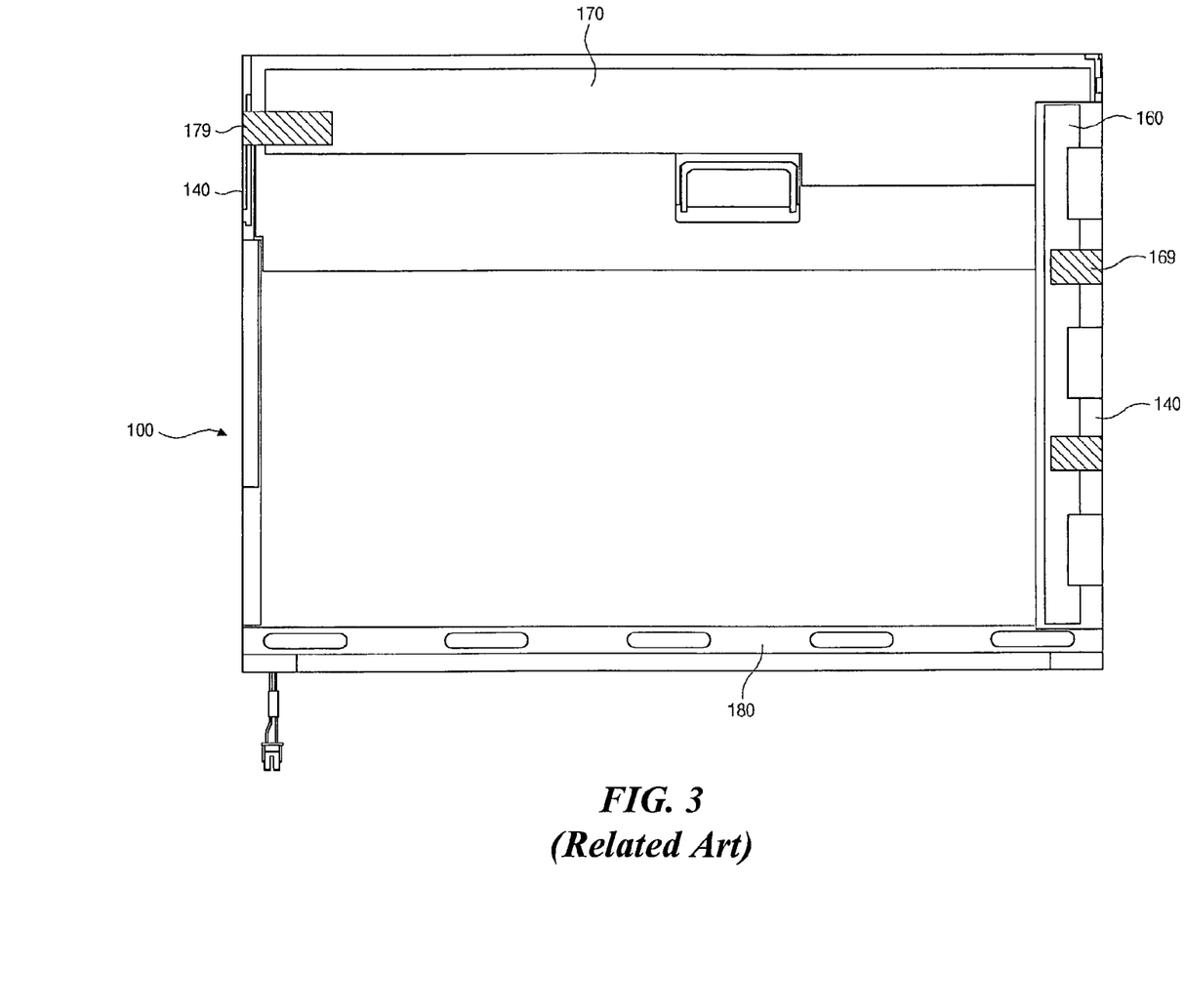
FIG. 3 is a bottom plan view of the LCD module of FIG. 2, and schematically illustrates the grounding method.

FIG. 3 is a bottom plan view of the LCD module 100 of FIG. 2, and schematically illustrates the grounding method. As shown in FIG. 3, the gate PCB 160 is electrically connected to the top case 140 via a first conductive tape 169 so that the gate PCB 160 has a stable ground connection. The first conductive tape 169 may be formed of copper (Cu), for example. In the related art LCD module 100, the gate PCB 160 is sufficiently grounded to the top case 140 because it has an area large enough to be connected via the first conductive tape 169. Meanwhile, the data PCB 170 is electrically connected to the top case 140 via a second conductive tape 179 so that the data PCB 170 has a stable ground connection. The second conductive tape 179 may be formed of aluminum (Al), for example. In the related art LCD module 100, since the top case 140 is coupled with a grounded bottom cover 180, the LCD module 100 has a stable ground connection, any accidental static electric discharge will not cause damage to the circuitries. However, this LCD module 100 is not desirable due to the number of fabrication process steps and high fabrication costs.

Figure 4:
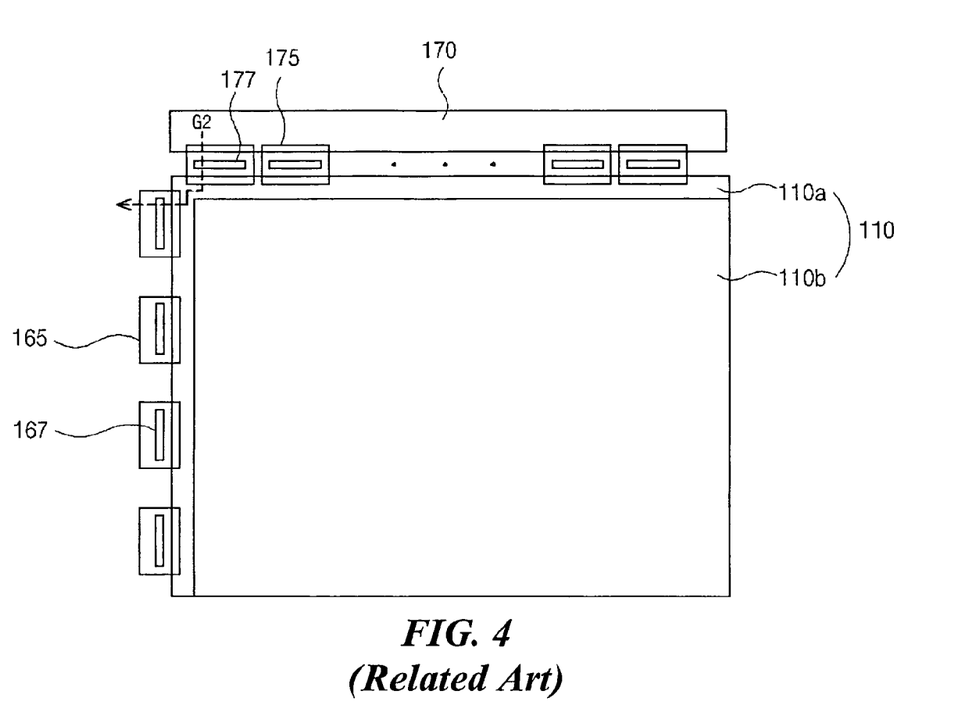
FIG. 4 is a schematic top plan view of another related art COF (chip on film) type LCD module.

FIG. 4 is a schematic top plan view of another related art chip on film (COF) type LCD module. As shown in FIG. 4, this LCD module includes the liquid crystal panel 110, the gate and data driving ICs 167 and 177, and the data PCB 170. However, unlike the LCD module 100 of FIG. 2, the LCD module of FIG. 4 does have a gate PCB. The gate PCB is not installed so as to reduce the process steps of fabricating the LCD module. Furthermore, the gate PCB makes a thinner module with increased spatial efficiency. When the gate PCB is not installed, the gate driving ICs 167 are controlled by the data PCB 170 and supply signals to the liquid crystal panel 110 via the first flexible films 165. Namely, the data PCB 170 controls both the gate and data driving ICs 167 and 177. Additionally, a grounding path G2 is installed to electrically connect the data PCB 170, the data and gate driving ICs 177 and 167. Unlike the LCD module of FIGS. 2 and 3, since no gate PCB is provided, the gate driving ICs 167 may not be grounded sufficiently to the top case. Namely, the LCD module of FIG. 4 does not have a stable grounding such that it can efficiently discharge static electricity so as to avoid damage to the circuitries. Therefore, the LCD module can be damaged by static electricity or have noise in the displayed images.

SUMMARY OF THE INVENTION

Accordingly, the present invention is directed to a liquid crystal display (LCD) module that substantially obviates one or more of the problems due to limitations and disadvantages of the related art.

An object of the present invention is to provide an LCD module that has a structure for preventing static electricity.

Another object of the present invention is to provide an LCD module having low production costs and a simple structure.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, the LCD module includes a liquid crystal panel, a backlight assembly to supply light to the liquid crystal panel, at least one first flexible film having printed circuit patterns, a gate driving integrated circuit (IC) on the first flexible film, at least one ground pad on the first flexible film, and a top case electrically connected to the ground pad.

In another aspect, an LCD module includes a liquid crystal panel including two opposite substrates, a backlight assembly to supply light to the liquid crystal panel, a first flexible film having first printed circuit patterns and a gate driving integrated circuit (IC) to apply signals to the liquid crystal panel, a second flexible film having second printed circuit patterns, a data driving IC to apply signals to the liquid crystal panel, a data printing circuit board (PCB) to supply signals to the data driving IC via the second flexible film, a ground pad on a surface of the first flexible film, and a top case electrically connected to the ground pad so as to discharge static electricity generated in the liquid crystal panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, which are illustrated in the accompanying drawings. While the principles of the embodiments of the present invention are generally applicable to the many types of available flat panel displays, it will be discussed with respect to a liquid crystal display (LCD) module that is used as a monitor for a portable computer. Wherever possible, the same reference numbers will be used throughout the drawings to refer to the same or like parts.

Figure 5:
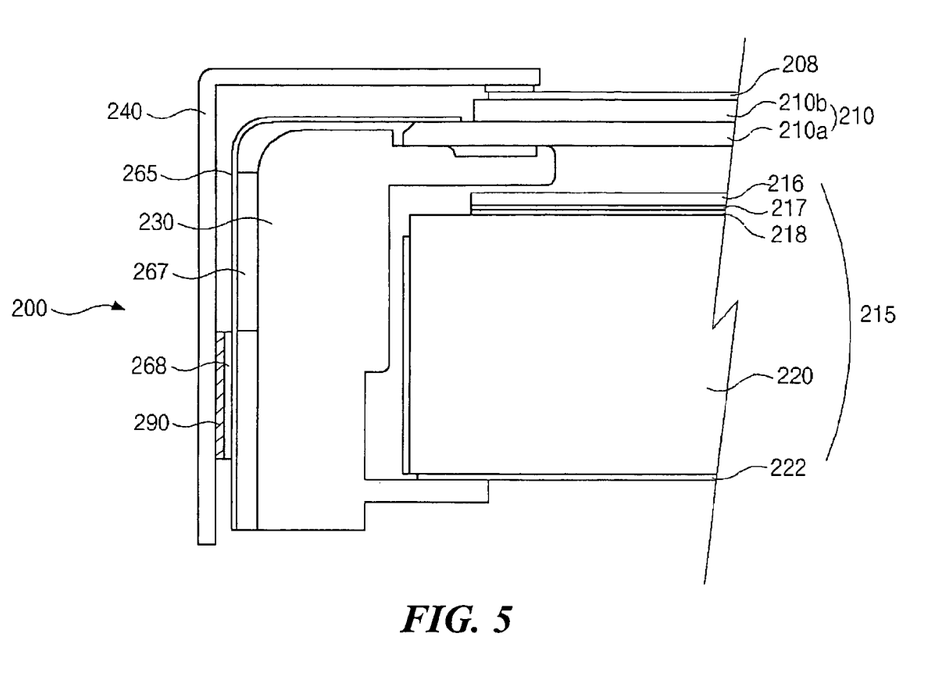
FIG. 5 is a partial cross sectional view of a COF type LCD module.
Figure 6:
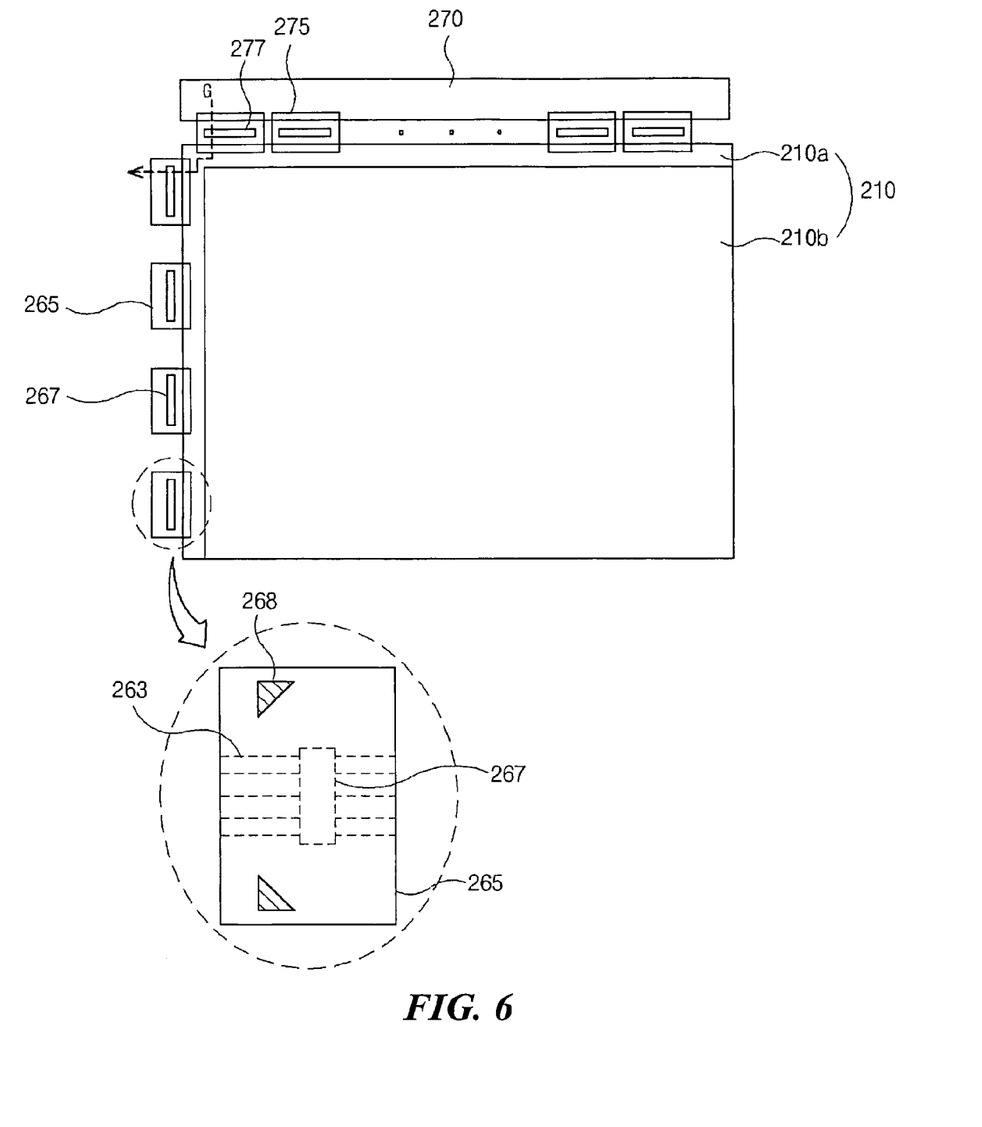
FIG. 6 is a schematic top plan view of the COF type LCD module of FIG. 5.

FIG. 5 is a partial cross sectional view of a chip on film (COF) type LCD module 200 according to the present invention. FIG. 6 is a schematic top plan view of the COF type LCD module 200 of FIG. 5. Particularly, FIG. 5 shows a ground pad 268 formed on a first flexible film 265, and FIG. 6 shows a liquid crystal panel 210, gate and data driving integrated circuits (ICs) 267 and 277, a data printing circuit board (PCB) 270, and connections thereof Furthermore, as shown in FIGS. 5 and 6, the present invention does not includes the gate PCB 160 of FIG. 2. However, unlike the related art LCD module of FIG. 4, the LCD module 200 has a stable ground connection between the gate driving ICs 267 and the top case 240.

As also shown in FIG. 5, the LCD module 200 includes the liquid crystal panel 210, a polarizing sheet 208 and a backlight assembly 215. The liquid crystal panel 210 includes a lower substrate 210a, an upper substrate 210b, and a liquid crystal layer (not shown) in between. The polarizing sheet 208 is disposed over the liquid crystal panel 210. The backlight assembly 215 includes multiple prism sheets 216 and 217, a diffusion sheet 218, a light guide plate 220, and a reflective plate 222. In addition, the LCD module 200 includes a main support 230 where the liquid crystal panel 210 and the backlight assembly 215 are installed. The liquid crystal module 200 also includes an electrically conductive or metallic top case 240 that fastens the liquid crystal panel 210 and the backlight assembly 215 to the main support 230 and protects the liquid crystal panel 210 from external impact. As shown in FIG. 5, the main support 230 braces the backlight assembly 215 and supports the liquid crystal panel 210, and the top case 240 is further coupled with the main support 230 to hold the liquid crystal panel 210 and the backlight assembly 215.

Although not shown in FIG. 5, the backlight assembly 215 includes at least one lamp accommodated by a lamp housing (not shown). The lamp housing is generally installed in the main support 230. The at least one lamp is connected to an inverter (not shown) and emits light toward the liquid crystal panel 210. The light guide plate 220 is disposed under the diffusion sheet 218. The reflective plate 222 is disposed between the light guide plate 220 and a bottom portion of the main support 230. The light guide plate 220 receives light emitted by the lamp and directs the received light to its output surface so that the light from the lamp can reach the liquid crystal panel 210 via the diffusion sheet 218 and the prism sheets 217 and 216. The reflective plate 222 reflects the light from the lamp toward the liquid crystal panel 210 to prevent loss of light and improve efficiency.

The light emitted by the lamp and propagated through the backlight assembly 215 generates images on the display panel 210 while the liquid crystal panel 210 is operated and driven. Although not shown in FIG. 5, the LCD module 200 includes a bottom cover adjacent to the main support 230 to protect the elements for the LCD module 200.

The main support 230 supports the backlight assembly 215 and the liquid crystal panel 210. The top case 240 fastens the liquid crystal panel 210 and the backlight assembly 215 onto the main support 230 by coupling them with the main support 230. The main support 230 and the top case 240 protect the liquid crystal panel 210 from external impact. The main support 230 may be made of a plastic material having sufficient impact resistant.

In order to operate the liquid crystal panel 210 to display images, the gate and data driving ICs 267 and 277 are connected to the liquid crystal panel 210 such that they supply electric signals to the liquid crystal panel 210, as shown in FIGS. 5 and 6. Namely, the gate and data driving ICs 267 and 277 are mainly controlled by the data PCB 270, and apply scanning and video signals, respectively, to the liquid crystal panel 210.

As shown in FIG. 6, the gate and data driving ICs 267 and 277 are formed on first and second flexible films 265 and 275, respectively. The first and second flexible films 265 and 275 are often referred to as gate and data driving films, respectively. The data driving ICs 277 are connected to both the liquid crystal panel 210 and the data PCB 270 via the data driving films 275. The gate driving ICs 267 are connected to the liquid crystal panel 210 via the gate driving films 265, but not to a gate PCB because there is no gate PCB employed in the present invention. However, the gate driving films 265 of the present invention each have at least one ground pad 268 to be earthed.

As shown in a partially enlarged view of FIG. 6, the gate driving film 265 includes printed circuit patterns 263 that transmit the scanning signals from the gate driving ICs 267 to the liquid crystal panel 210. Furthermore, the printed circuit patterns 263 may deliver the output signals from the data PCB 270 to the gate driving ICs 267 to control the gate driving ICs 267. Although not shown in FIG. 6, the data driving films 275 also have the printed circuits delivering electric signals.

The LCD module 200 includes a grounding path G in order to protect the above-mentioned circuitries from static electricity to thereby prevent electrostatic damage. As shown in FIG. 6, the grounding path G interconnects the data PCB 270, the data driving IC 277 and gate driving IC 267.

The grounding path G is connected directly to the ground pad 268 formed on the gate driving films 265. The ground pad 268 should be disposed in an area where the printed circuit patterns 263 are not formed, and may be formed on a surface carrying the gate driving IC 265 or an a surface opposite to the gate driving IC 265. To obtain a stable ground connection, the ground pad 268 may be designed to have a large area on the gate driving film 265. Although the enlarged view of FIG. 6 shows that the ground pad 268 is shaped like a triangle, the ground pad 268 may have various shapes, for example, rectangles, circles or the like. Furthermore, a plurality of the ground pads 268 may be formed on the gate driving film 265 in a symmetric arrangement.

As shown in FIG. 5, the gate driving film 265 is interposed between the main support 230 and the top case 240, and then is bent downward along a sidewall of the main support 230. In such an arrangement, the gate driving IC 267 faces the main support 230 and the ground pad 268 faces the top case 240. In addition, the ground pad 268 is electrically connected to the top case 240 via a conductive tape 290 that has adhesive properties to adhere to both the top case 240 and the ground pad 268. Thus, unlike the related art LCD module of FIG. 4, the liquid crystal panel 210 in embodiments of the present invention have a stable ground connection.

The data PCB 270 of FIG. 6 may be electrically connected to the top case 240 via a conductive tape, such as aluminum or the like. Since the top case 240 is coupled with a grounded bottom cover (corresponding to the grounded bottom cover 180 of FIG. 3), the liquid crystal panel 210 have a stable ground connection and discharge accidental static electricity, so that no electrostatic damage will occur to the circuitries.

The exemplary embodiments of the present invention provide the following advantages. Since the gate driving films 265 have ground pads 268 that are electrically connected to the top case 240, the stable ground connection can be provided for the components of the liquid crystal panel 210. Therefore, the LCD module 200 can efficiently discharge accidentally-generated static electricity and prevent noise in the images displayed.

What is claimed is:

1. A liquid crystal display (LCD) module, comprising:
    a liquid crystal panel;
    a backlight assembly to supply light to the liquid crystal panel;
    at least one first flexible film having first printed circuit patterns;
    a gate driving integrated circuit (IC) on the first flexible film;
    at least one ground pad on the first flexible film; and
    a top case electrically connected to the ground pad,
    wherein the at least one ground pad is disposed on a surface of the first flexible film, and the gate driving IC is disposed on an opposite surface of the first flexible film.

2. The LCD module according to claim 1, wherein the first flexible film is connected to the liquid display panel, disposed between the top case and a main support of the liquid display panel, and bent in parallel along a sidewall of the main support.

3. The LCD module according to claim 1, wherein the at least one ground pad is disposed in an area separate from where the printed circuit patterns are formed.

4. The LCD module according to the claim 3, wherein the at least one ground pad has a triangular shape.

5. The LCD module according to claim 4, wherein a plurality of the ground pads are symmetrically arranged on the first flexible film about the gate driving IC.

6. The LCD module according to claim 1, wherein the ground pad faces the top case.

7. The LCD module according to claim 1, further comprising a conductive tape between the ground pad and the top case to electrically connect the ground pad to the top case.

8. The LCD module according to claim 7, wherein the conductive tape has adhesive properties to adhere to both the top case and the ground pad.

9. The LCD module according to claim 1, further comprising at least one second flexible film having second printed circuit patterns, a data driving IC, and a data printing circuit board (PCB) to control the data driving IC.

10. The LCD module according to claim 9, wherein the data PCB also controls the gate driving IC.

11. The LCD module according to claim 10, wherein the data PCB is connected to the top case to have a ground connection.

12. The LCD module according to claim 9, further comprising a grounding path that interconnects the data PCB, the data driving IC and the gate driving IC.

13. The LCD module according to claim 12, wherein the ground pad is connected to the grounding path.

14. The LCD module according to claim 1, wherein the backlight assembly includes:
- a lamp to emit light;
- a reflective plate to reflect the light toward the liquid crystal panel;
- a light guide plate disposed over the reflective plate, the light guide plate for receiving and directing the light to the liquid crystal panel;
- a diffusion sheet disposed over the light guide plate; and
- a plurality of prism sheets disposed over the diffusion sheet.

15. The LCD module according to claim 14, where the backlight assembly further includes a polarizing sheet between the liquid crystal panel and the top case.

16. The LCD module according to claim 14, wherein the main support supports the liquid crystal panel and the backlight assembly.

17. The LCD module according to claim 16, wherein the backlight assembly is disposed between the main support and the liquid crystal panel.

18. A liquid crystal display (LCD) module, comprising:
- a liquid crystal panel including two opposite substrates;
- a backlight assembly to supply light to the liquid crystal panel;
- a first flexible film having first printed circuit patterns and a gate driving integrated circuit (IC) to apply signals to the liquid crystal panel;
- a second flexible film having second printed circuit patterns, a data driving IC to apply signals to the liquid crystal panel, a data printing circuit board (PCB) to supply signals to the data driving IC via the second flexible film;
- a ground pad on a surface of the first flexible film; and
- a top case electrically connected to the ground pad so as to discharge static electricity generated in the liquid crystal panel.

19. The LCD module according to claim 16, further comprising a conductive tape between the ground pad and the top case to electrically connect the ground pad to the top case.

* * * * *